United States Patent [19]

Steinorth

[11] Patent Number: 5,706,798

[45] Date of Patent: Jan. 13, 1998

[54] SOLAR LENS, STOVE AND SOLAR PANEL COMBINATION

[76] Inventor: Edward O. Steinorth, 3079 Deerfield Rd., Deerfield, Ill. 60015

[21] Appl. No.: 752,615

[22] Filed: Nov. 19, 1996

Related U.S. Application Data

[63] Continuation-in-part of Ser. No. 617,482, Mar. 15, 1996, abandoned.

[51] Int. Cl.$^6$ ........................................... F24J 2/02
[52] U.S. Cl. ..................... 126/681; 126/680; 126/698; 126/700
[58] Field of Search ..................... 126/681, 680, 126/714, 698, 600, 606, 607, 608, 699, 909, 700

[56] References Cited

U.S. PATENT DOCUMENTS

| 3,929,121 | 12/1975 | Rogers | 126/690 X |
| 4,043,260 | 8/1977 | LaPour et al. | 126/30 X |
| 4,913,130 | 4/1990 | Inagaki et al. | 126/700 X |

FOREIGN PATENT DOCUMENTS

| 2565678 | 12/1965 | France | 126/681 |
| 3520694 | 1/1986 | Germany | 126/698 |
| 675908 | 11/1990 | Switzerland | 126/700 |

*Primary Examiner*—Larry Jones

[57] ABSTRACT

The invention comprises a solar assembly for heating a stove with solar energy. The assembly includes a foundation pipe having an opening. A substantially vertical pipe is positioned in the opening and the vertical pipe is capable of rotation relative to the foundation pipe. A stove is releasably attached to the vertical pole. A downward sloping arm is fixed to the top end of the vertical pole. A vertical adjustment member is slidably positionable on the downward sloping arm. The vertical adjustment member is capable of adjustment in height. A frame supporting a solar lens is pivotally attached to the vertical adjustment member. The vertical adjustment member is used to adjust the frame, and the solar lens, so that the solar lens directs solar energy to the stove. It is also contemplated that a solar panel or solar collector be positioned in place of the solar lens.

19 Claims, 6 Drawing Sheets

5,706,798

SOLAR LENS, STOVE AND SOLAR PANEL COMBINATION

This is a continuation-in-part application of application Ser. No. 08/617,482 filed Mar. 15, 1996, now abandoned.

BACKGROUND OF INVENTION

The present invention is a new and useful improvement in manual Combination Solar Lens, Stove, and Solar Panel Technology, which will provide a source of free heat for boiling or distilling drinking water, cooking, industrial or other uses, during hours of sunshine, from sunup to sundown at any elevation, any azimuth, or at any latitude. It will also provide a method, by means of Solar Panels, converters and batteries of using and storing electrical power during the day and after dark. This invention is labor intensive but can be used and controlled by one person, is transportable, and complete. The Solar Lens. Stove and Solar Panel Combination is particularly useful for desert areas, areas denuded of wood or other fuel, and seacoast or brackish water areas where a distiller can be used.

DESCRIPTION OF PRIOR ART

Previous manual solar lens, stove and solar panel combinations may have used a solar lens and focal point to provide heat, and solar panels to absorb and utilize solar energy, but have always been cumbersome and difficult to move manually and to constantly keep the solar lens focused on a stationary point, or to keep the solar panel continuously perpendicular to the sun, regardless of latitude, as the sun changes its position in elevation and azimuth, on the horizon, at its zenith, and back down to the horizon. Previous solar lens, stove and or solar panel combinations have never allowed the solar lens and stove to be manually, easily and constantly moved to track the sun, or are capable of holding the stove level at all times so as to aim, concentrate and focus the heat and light of the sun's rays on the stove or other objects from sunset to sunrise, or to keep the solar panel perpendicular to the sun during all daylight hours. No previous inventions have been capable of manually moving such large solar lenses or solar panels so easily and accurately and although labor intensive, requiring only one operator to keep the focus and heat of the sun's rays on the stove or solar panel at all times.

OBJECTS AND ADVANTAGES

The principal object of the invention is to provide a cheap, easily controlled, manual, labor intensive, and portable method of providing solar heat for boiling drinking water, and by use of a simple distiller, distilling sea or polluted water, cooking, burning waste, and for industrial and other uses where heat is required during hours of sunshine. By substituting Solar Panels for the Solar Lens, Electric Power is easily available for use and for storage in batteries. Desert Areas, Seacoast Areas and Areas which have been depleted of trees or other types of fuel can now have a reliable and free source of heat for boiling or distilling water cooking, for other uses, and Electric Power where none or very little was available before.

A further object of the invention is to allow the heat of the sun's rays to be focused manually by a solar lens and aimed constantly at a stove or work area throughout the hours of sunlight by rotating the structure by means of a handle. A projecting arm supporting the Lens and or Panel can always be pointed at the sun and the lens always set perpendicular to the sun, and tilted so as to receive the maximum heat of the sun's rays and by using ropes and pulleys to raise, lower, and tilt the solar lens so as to set the focus of the rays of the sun on the stove or work area and also has the ability to adjust the hat at the stove or work area from moderate to intense by raising or lowering the solar lens. The solar lens can be used without the solar panel, or the solar panel can be placed in the frame above the solar lens, or in the frame when the solar lens is removed, and can be kept perpendicular to the sun in the same manner as the solar lens and by use of converters and or batteries, can provide electric power directly or to be stored for use during day or night.

A solar lens consisting of a fresnel lens, or other lenses, supported and fastened to a frame and a bail, which concentrates the rays and heat of the sun to a focal point. The frame and bail allow a solar lens and or a solar panel to be maneuvered so as to focus the rays of the sun to a point where the heat and light of the sun's rays are concentrated for useful purposes, and where the solar lens and or solar panel and the frame and bail are under complete manual control of the operator of the unit at all times.

A structure consisting of a vertical pole, a sloping arm and a foundation pipe, provide the support for a solar lens, with or without a solar panel, a frame, a bail, a handle and a stove. The frame will hold the solar lens, the solar panel, or the solar lens with the solar panel above, as required. A converter and a battery will be used to utilize and store electricity generated by the Solar Panel. The structure is moved in azimuth by a handle so the sloping arm can manually be aimed at the sun whenever the lens and or panel is in use.

A handle is permanently fastened to a movable collar encircling the vertical pole, said movable collar can be pinned to the vertical pole at 0, 90, or 180 degrees from the direction of a projecting arm allowing the entire structure to be moved in azimuth by the operator's use of the handle, so as to constantly keep the projecting arm pointed at the sun. The end of the handle is long enough to hold a stove at the focus of the solar lens, and flattened to accept a stove bracket under the stove, said stove is thus movable along the handle. The stove bracket and flattened end of the handle hold the stove level and at the focal point of the solar lens and keep the legs clear of the ground as the structure is moved in azimuth.

Lines and pulleys are provided to manually keep the frame and solar lens and or solar panel perpendicular to the projecting arm, to tilt the frame and solar lens and or solar panel so as to have the sun's rays impact perpendicularly on the solar lens or solar panel, to lift the solar lens and or solar panel in the frame vertically, and to allow the solar lens and or solar panel in the frame, to be moved downward by gravity or be pulled upward manually on the sloping projecting arm to match the elevation of the sun. These lines which are held in place by holdfasts on the vertical pole near the handle, are easily controlled by a single operator who thus can control the placement and amount of heat to be focused on the stove or ground by adjusting the lines to focus the heat on, above, or below the surface of the stove or ground. These lines will also, when the solar panel is in use, keep the solar panel perpendicular to the sun's rays.

Lines and sandbags and or stakes are provided to keep the pole vertical and to hold the frame, solar lens, and or solar panel in position during windy or inclement weather.

A flat plate metal stove is provided with a bracket underneath the stove to slide the stove on and off the handle and to hold the stove level while the structure is being moved in azimuth. The stove has raised edges on three sides for better cooking, and a high return on the pole side to allow more heat to be absorbed at low elevations of the sun. Four legs are provided on the stove and are kept clear of the ground during solar lens use, but are used when the stove is removed from the handle during inclement weather and or for use with wood or other fuel. The stove can be used to support a converter and or a battery when the solar panel is in use.

A fitting on the top of the vertical pole is used to fasten the high end of a sloping projecting arm at the proper angle so that a slip fitting on the projecting arm can move easily downward by gravity or upward by means of force applied to a rope and a pulley. The fitting will have a vertical projection on top to allow a line or lines to be looped over said projection and thence, down to a sandbag or sandbags and or stakes to counter balance the weight of the projecting arm, solar lens and or solar panel, frame, bail and stove, thus preventing the vertical pole from tipping and causing friction with the foundation pipe, which would make the structure difficult to turn in azimuth.

No other manually operated solar lens, stove, and or solar panel combination, is as easily controlled, or as versatile in its ability to focus the rays of the sun whenever needed. The structure and materials to support and maneuver the lens and stove are made of easily procured materials. The lens is a fresnel or other flat lens which can be set up as a single lens or as an array or combination of lenses which will be capable of concentrating the rays of the sun to a single point where the heat of the rays of the sun at the focal point or at points above or below the focal point can be utilized for boiling water for drinking or distilling, for cooking, burning waste, or for industrial uses. The panel is a solar collector which will produce electricity for immediate use with a converter, or to be stored in batteries. The solar lens or lenses can be massed produced of plastic or other, preferably lightweight materials to allow the combination to be easily maneuvered and transported.

The solar panels are state of the art solar collectors, the frame, and bail can be manufactured of metal or other materials. The structure can be made of metal pipes or other materials, and ropes and pulleys are readily available. The stove can be made of any metal that can withstand intense heat and is designed to be removable when not needed at the focal point, during inclement weather, or when the stove is to be used with wood or other fuels.

DRAWING FIGURES

Other objects and advantages reside in details of construction and operation as more fully described and claimed, reference being made to accompanying drawings forming parts hereof, wherein like numerals refer to like parts throughout, and in which:

DESCRIPTION

Referring now to the drawings in detail wherein I have shown a preferred embodiment of the invention. The numeral 1, denotes a vertical pole. Numeral 1a, denotes an angle fitting on top of the vertical pole 1. A fitting 1a, which unites the vertical pole 1, and a downward sloping projecting arm, numeral 2, has a vertical projection at the top to fasten a rope 9c, which runs down to a sandbag 19. The fitting 1a, is set at the proper angle to assure that a slip collar 3, will move down the sloping projecting arm 2, by means of gravity, and up by means of a line 9, which runs to a pulley 8, on the vertical pole 1, and thence to a quick engage and release holdfast 10. A stop coupling 4, is fastened to the low end of the sloping arm 2, to prevent the slip collar 3 and attachments from sliding off the end of the sloping arm 2. A solar lens Numerals 6, 6a, 6b, 6c, and solar panel 20, 20a, 20b, 20c, a frame 7, and a bail 5, which is attached to the slip collar 3, by means of pulleys 8a, 8b, and line 9a.

Figures 4, 5:
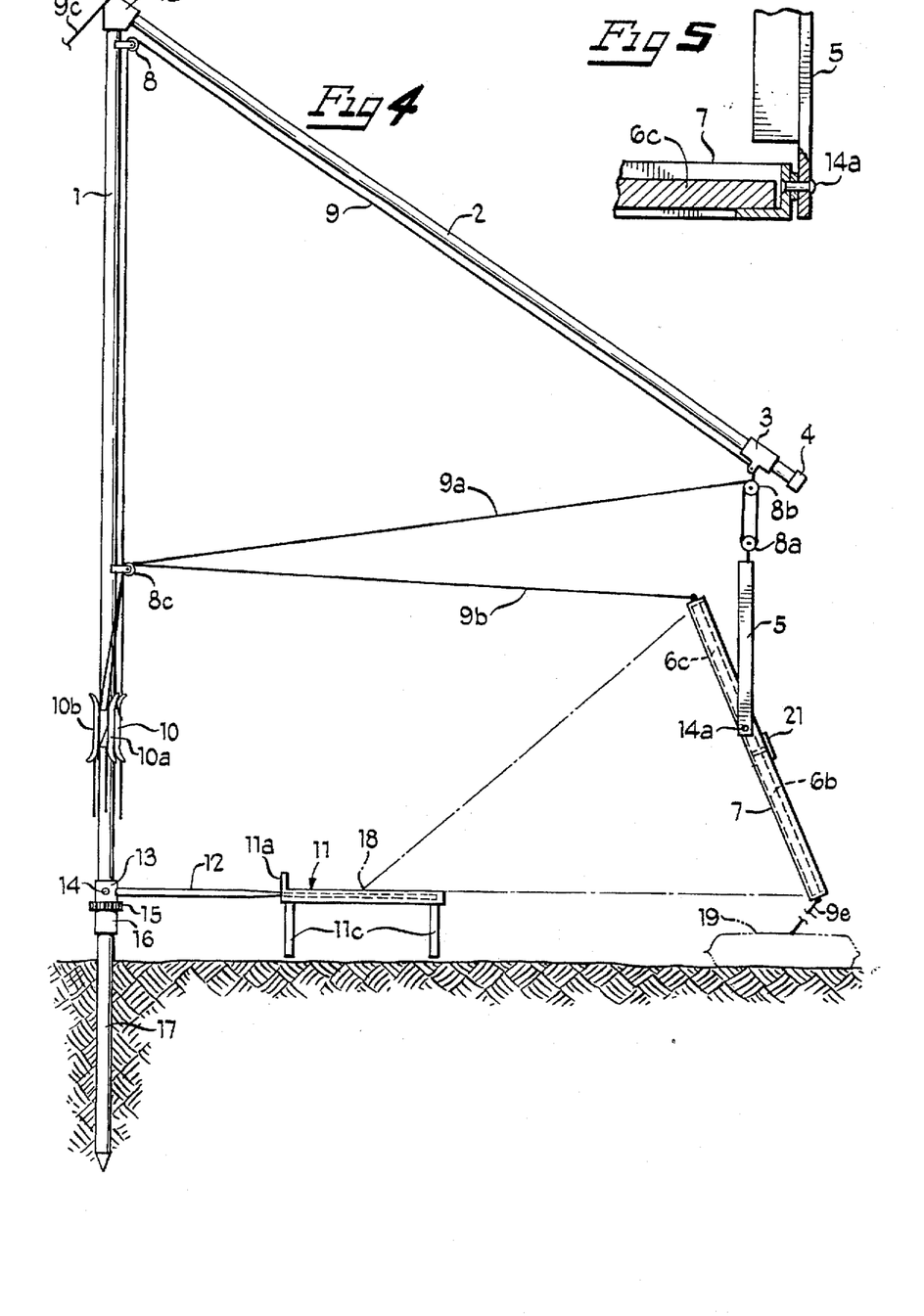
FIG. 4 is an elevation view of the solar lens and stove combination embodying the features of this invention at the minimum elevation of the sun.
FIG. 5 is a detailed view and a section of the solar lens, frame, and bail.
Figures 4A, 5A:
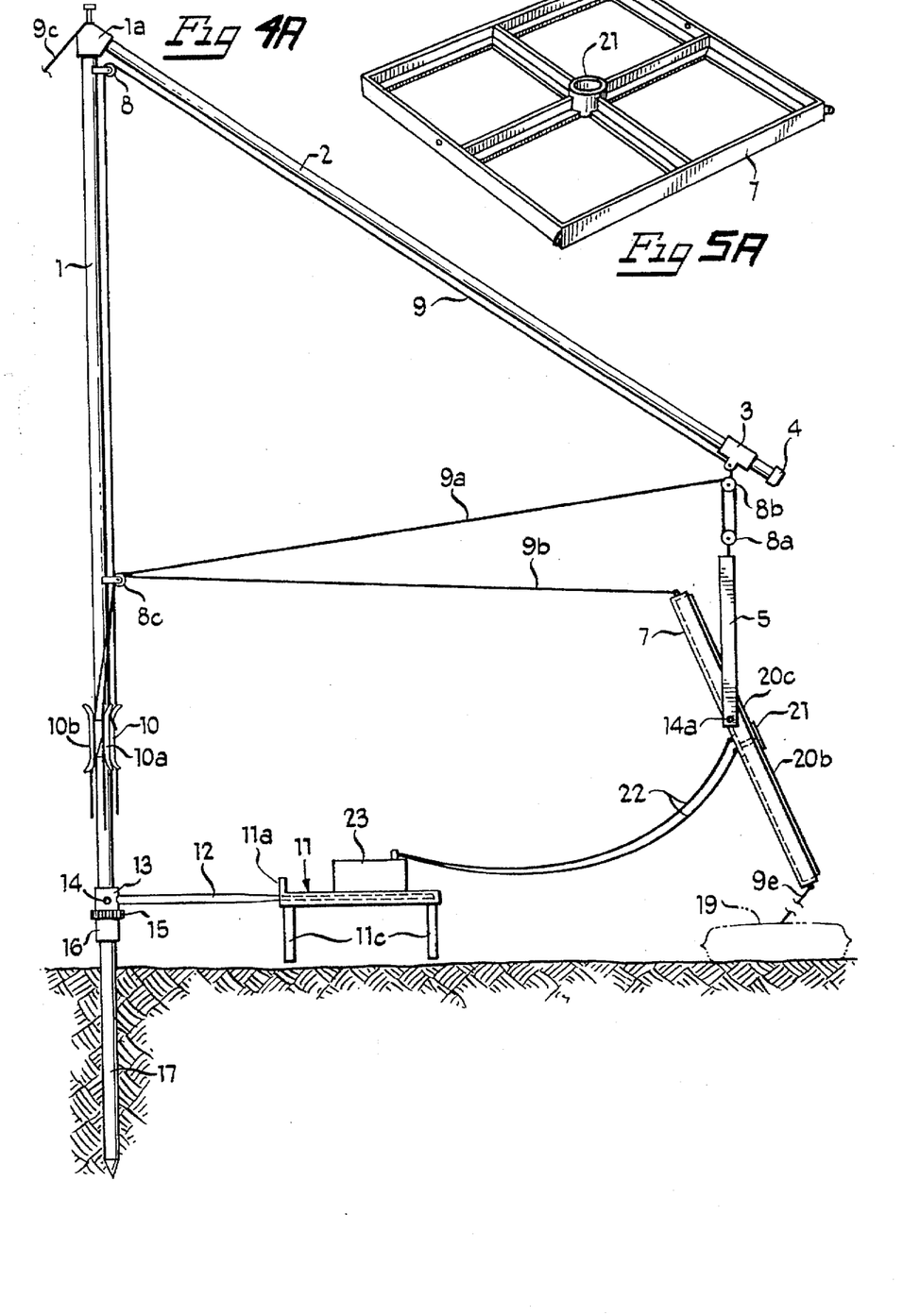
FIG. 4A is an elevation view of the solar lens, stove and solar panel combination embodying the features of this invention at the minimum elevation of the sun.
FIG. 5A is a detailed view of a section of the solar lens, solar panel, frame and bail.
Figure 6:
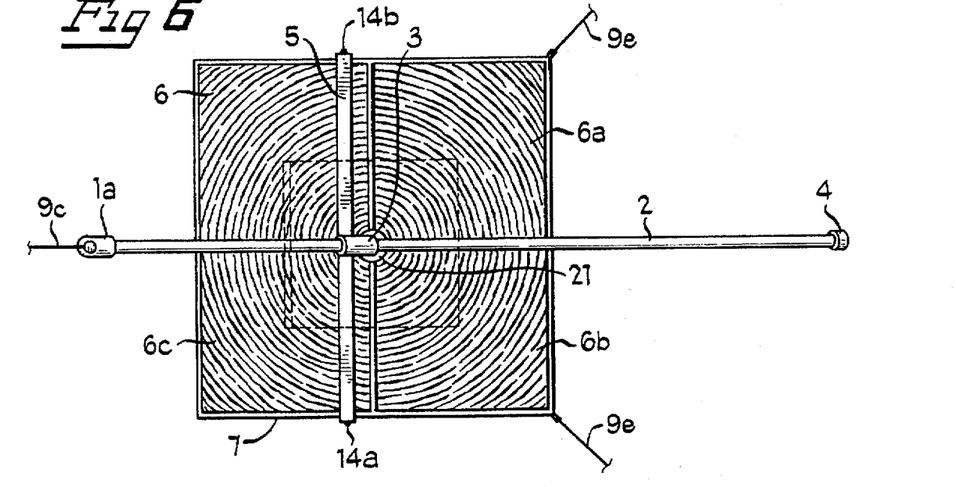
FIG. 6 is a plan view of the solar lens and stove combination embodying the features of this invention at the maximum elevation of the sun.
Figure 6A:
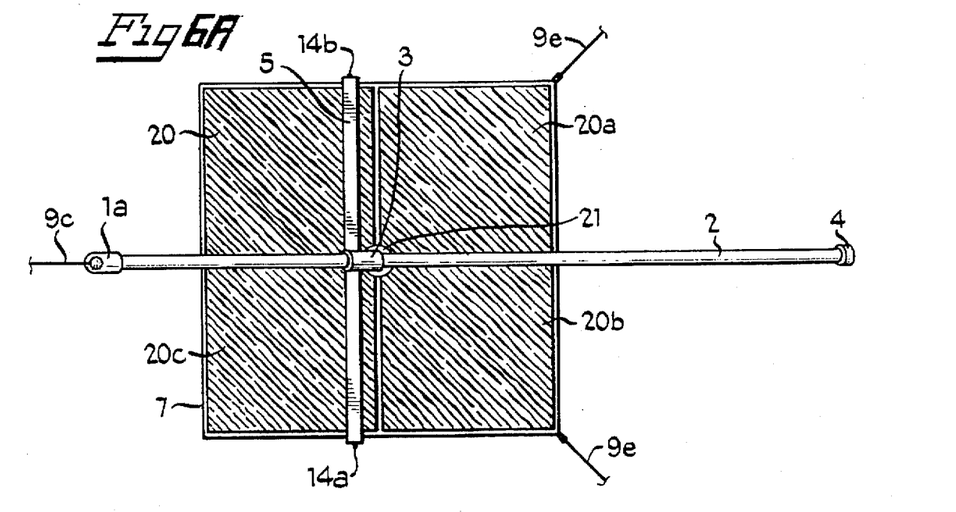
FIG. 6A is a plan view of the solar lens, stove, and solar panel combination embodying the features of this invention at the maximum elevation of the sun.
Figure 7:
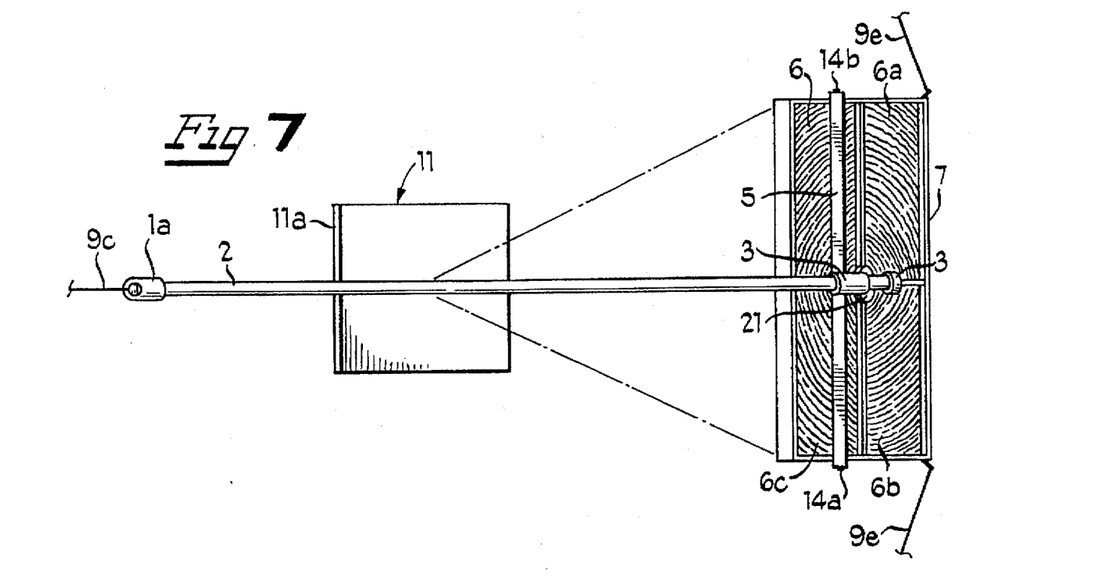
FIG. 7 is a plan view of the solar lens and stove combination embodying the features of this invention at the minimum elevation of the sun.
Figure 7A:
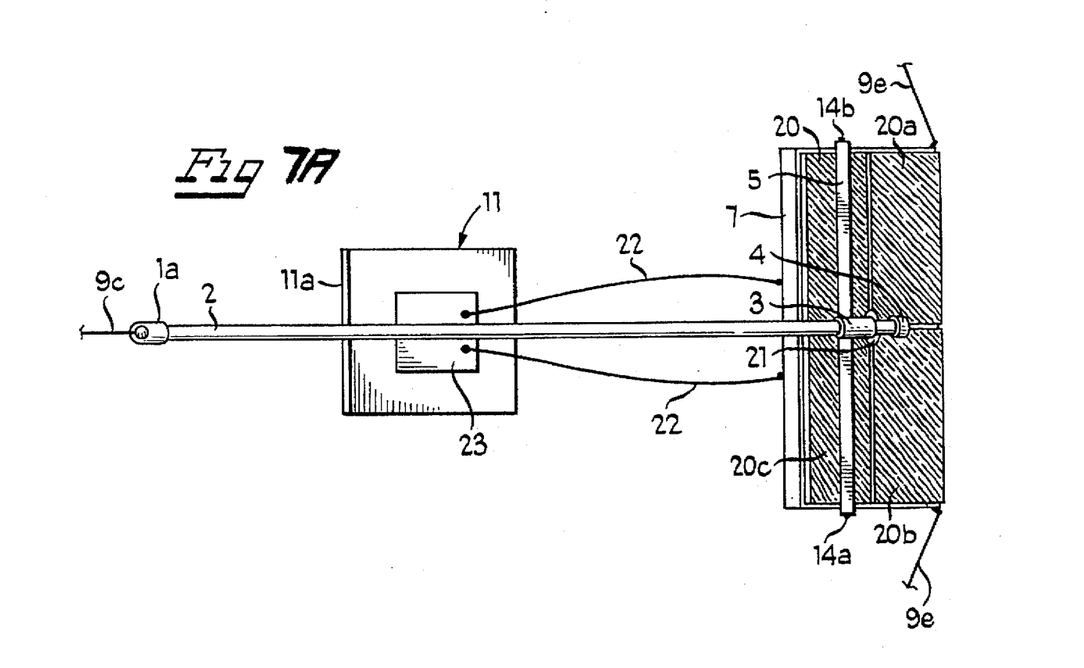
FIG. 7A is a plan view of the solar lens, stove and solar panel combination embodying the features at the minimum elevation of the sun.
Figure 8:
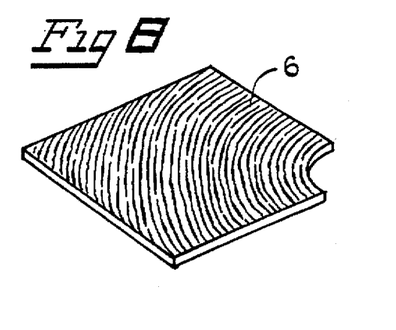
FIG. 8 is a plan view of a quarter section of a solar lens.
Figure 8A:
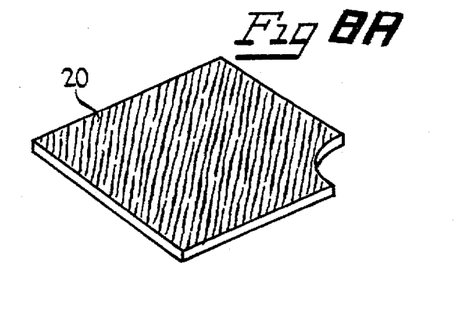
FIG. 8a is a plan view of a quarter section of a solar panel.

A bail 5, is attached to the solar lens and or solar panel frame 7, by pivot pins 14a and 14b. The bail 5, is mounted off center so that the frame 7, and lenses 6, 6a, 6b, and 6c, and or solar panels 20, 20a, 20b, and 20c, will hang vertically unless the top of the frame 7, is tipped toward the vertical pole 1, by a line 9b, running from the top of the frame 7, said frame holding solar lenses 6, 6a, 6b, and 6c, and or solar panels 20, 20a, 20b, and 20c, and thence to a pulley 8c, on the vertical pole 1, and thence down to a quick engage and release holdfast 10a, attached to the vertical pole 1. A pulley 8a, at the top of bail 5, is attached to another pulley 8b, fastened to the bottom of slip collar 3, by line 9a which runs through pulley 8a, and pulley 8b, and thence to pulley 8c, on the vertical pole 1, and down to a quick engage and release holdfast 10a. The Line 9a, is used to raise and lower the bail 5, and solar lenses 6, 6a, 6b, and 6c, and solar panels 20, 20a, 20b, and 20c, set in frame 7, so as to adjust the focal point 18, of the sun's rays on the stove 11, or to keep the solar panel perpendicular to the sun.

A handle 12, which is horizontally flattened at the end away from the pole to supports a stove 11, is attached to a moveable collar 13, at the lower end of vertical pole 1. The movable collar 13, is fastened with a pin 14, to the vertical pole 1. The handle 12, is securely fastened to the movable collar 13. A removable stove 11, which slides and stays level on the handle 12, by means of a bracket 11b, will normally be positioned directly under the sloping projecting arm 3, but the handle 12, is capable of being moved and pinned to the vertical pole 1, at 0, 90, or 180 degrees to the projecting arm 2 by a pin 14. The handle 12 can thus be used to swing the combination of the projecting arm 2, solar lenses 6, 6a, 6b, and 6c, and or solar panels 20, 20a, 20b, and 20c, set in frame 7, bail 5, and stove 11, so as to point the projecting arm 2, directly at the sun. This assures that the focal point 18, of the rays of the sun can be aimed at the Stove 11, when the stove 11, is in a position directly under the projecting arm 2. By removing pin 14 from the movable collar 13, and vertical pole 1, the handle 12, can be moved to another position on the vertical pole 1. The movable collar 13, and the handle 12, with or without the stove 11, can be moved 90 or 180 degrees away from the focal point of the solar lens 18. By reinserting the pin 14, the handle 12, and or stove 11, can be used as needed, under or away from the focal point 18, or as a support for a converter and or a battery 23.

Figure 1:
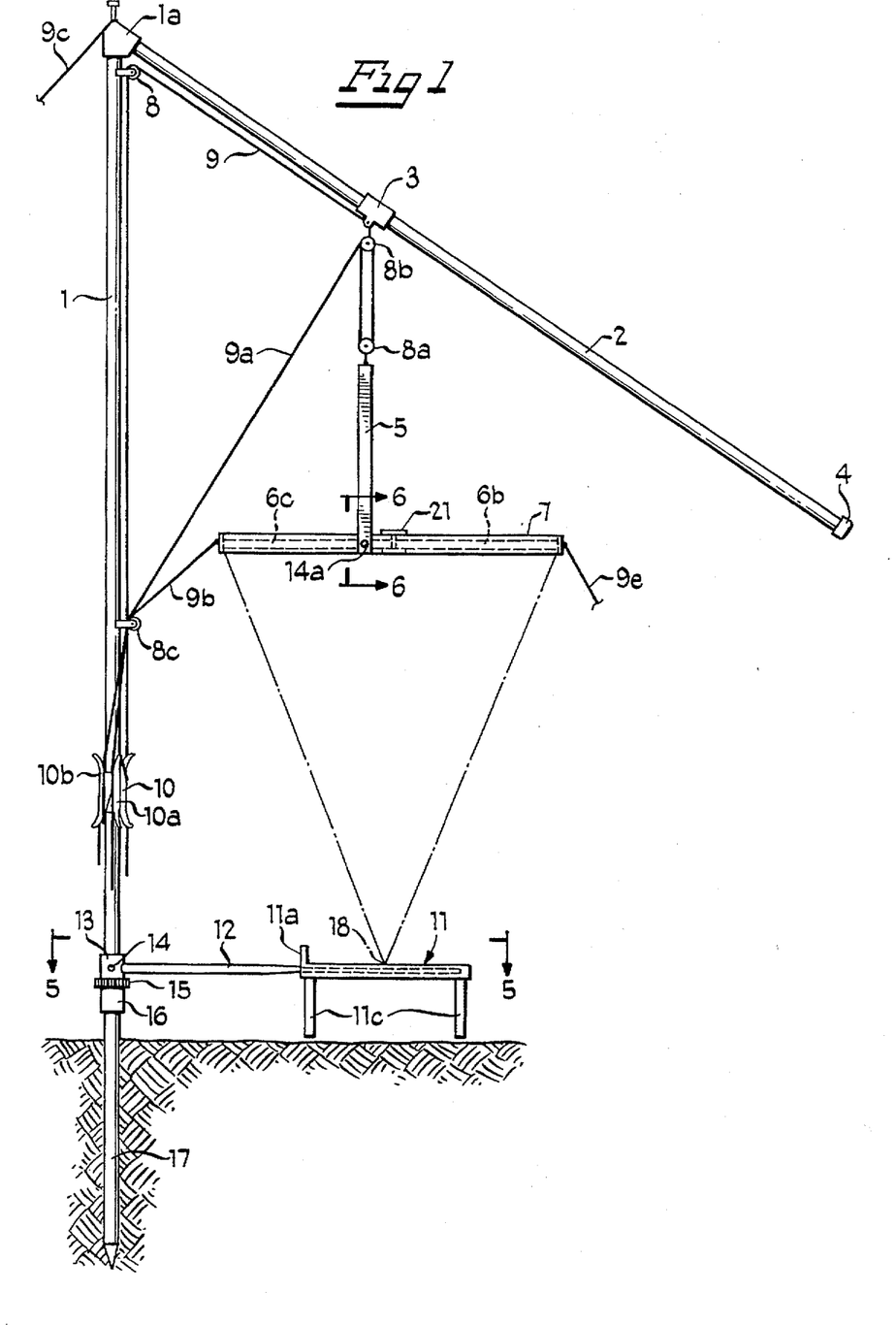
FIG. 1 is an elevation view of the solar lens and stove combination embodying the features of this invention at the maximum elevation of the sun.
Figures 1A, 2, 3:
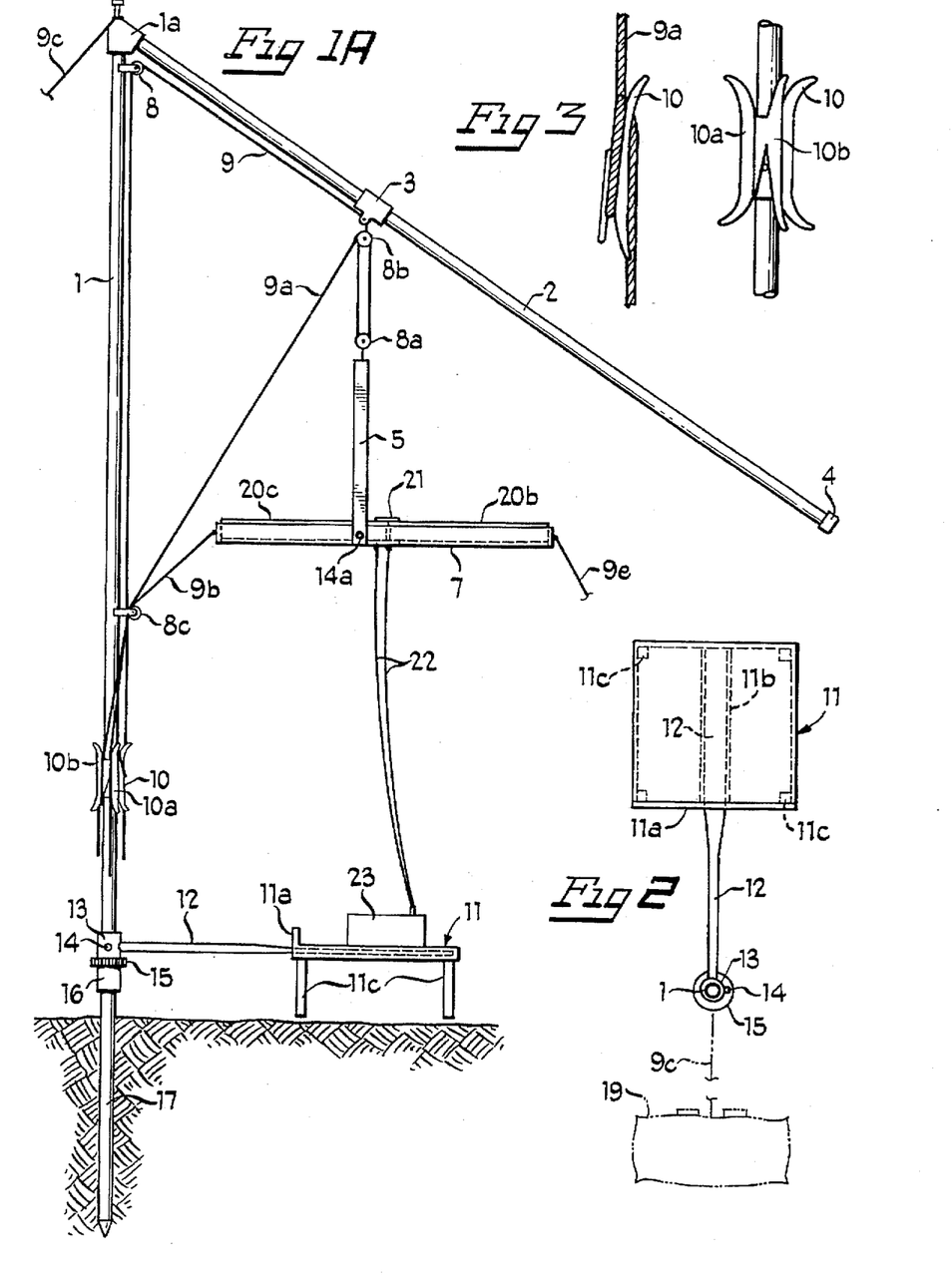
FIG. 1A is an elevation view of the solar lenses, stove, and solar panel combination embodying the features of this invention at the maximum elevation of the sun.
FIG. 2 is a plan view of the flat plate metal stove and its supports.
FIG. 3 is a detailed view of the quick engage and release holdfasts.

A Stove 11, is a large square flat metal plate with slightly raised edges on three sides to aid in cooking and a raised return 11a, on the side toward the handle 12. The raised return 11a, will allow the stove 11, to receive more heat at low elevations of the sun. The focal point 18, will concentrate heat on the stove 11, at high and low elevations of the sun from sunup to sunset. A bracket 11b, underneath the stove 11, assures that the flat plate stove 11, will stay level and at the focal point of the lens 18, as the structure 1, and 2, is moved to follow the sun. The stove 11, can be easily removed from the flat section of handle 12. Four legs 11c, are attached to the stove 11. The legs are set to clear the ground when the stove 11, is rotated with the structure 1, and 2, but are used when the stove 11, is detached from the handle 12, for use with wood or other fuel during inclement weather. The stove 11, can be removed to allow the focal point 18, to be concentrated and used on the ground or for other uses.

A vertical pole 1 is mounted on a foundation pipe 17, with a stop nut 15, firmly attached to the vertical pole 1. A stop nut 15, prevents the vertical pole 1, from dropping through foundation pipe 17, by means of coupling 16, fastened to the top of the foundation pipe 17, so as to provide a base on which the stop nut 15, can rotate. This allows the vertical pole 1, the sloping arm 2, the lens 6, frame 7, bail 5, and stove 11, to move in azimuth as the handle 12, which is firmly attached to the collar 13, and fastened to the vertical pole 1, by the pin 14, is rotated. The vertical pole 1, and the collar 13, are held to the proper height by means of stop nut 15, so that the legs 11c, of the stove 11, will clear the ground when the entire combination 1, 2, 5, 6, 6a, 6b6c, and or 20, 20a, 20b, 20c, 7, 11, and 12, is moved horizontally to follow the sun. Legs 11c, will support the stove 11, when the stove is removed from the handle 12, for use with wood or other fuel. The focal point 18, of the solar lenses 6, 6a, 6b, and 6c, can be used on the ground to heat or distill drinking water, cooking, burning waste, or for other uses. The solar panels 20, 20a, 20b, and 20c, when in use will be held perpendicular to the rays of the sun. Electric lines 22, connect the solar panels 20 20a, 20b, and 20c, to a converter and or a battery 23, which will supply electric power of various voltages to be used by the operator of the unit during daylight or dark as required. The stove 11, can be used to support the converter and or a battery if required.

Having thus described the invention, it is to be understood that certain modifications in the construction and arrangement of the parts thereof will be made, as deemed necessary, without departing from the scope of the appended claims.

I claim:

1. A solar assembly for heating a stove with solar energy comprising:

a foundation pipe having an opening;

a substantially vertical pole positioned in the opening of the foundation pipe and capable of rotation within the foundation pipe;

a stove releasably attached to the vertical pole;

a downward sloping arm fixed to a top end of the vertical pole;

a vertical adjustment member slidably positionable on the downward sloping arm the vertical adjustment member including a height;

a frame supporting a solar lens, the frame pivotally attached to the vertical adjustment member; and means for remotely adjusting the solar lens to concentrate solar energy upon the stove.

2. The assembly according to claim 1 wherein:

the vertical adjustment member includes a collar member and a bail member;

the remote adjustment means further comprises a first rope member extending from the vertical pole cooperating with the collar member and the bail member, to, in turn, alter the distance between the collar member and the bail member; and a rope locking member attached to the vertical pole.

3. The assembly according to claim 1 wherein the remote adjusting means further includes:

a loop member positioned proximate the juncture of the vertical pipe member and the downward sloping arm;

a second rope extending from vertical adjustment member, through the loop member and generally abutting the vertical pole; and a rope locking member attached to the vertical pole.

4. The assembly according to claim 1 wherein the remote adjusting means further includes:

a third rope member extending from the frame member to the vertical pole, and a rope locking member attached to the vertical pole.

5. The assembly according to claim 1 wherein:

the vertical adjustment member includes a collar member and a bail member;

the remote adjustment means further comprises a first rope member extending from the vertical pole cooperating with the collar member and the bail member, to, in turn, alter the distance between the collar member and the bail member;

a loop member positioned proximate the juncture of the vertical pipe member and the downward sloping arm;

a second rope extending from vertical adjustment member, through the loop member and generally abutting the vertical pole;

a third rope member extending from the frame member to the vertical pole; and a rope locking member attached to the vertical pole capable of locking each of the first rope, the second rope and the third rope to preclude any movement of the rope members.

6. The assembly according to claim 1 further including a handle attached to at least one of the stove and the vertical pole.

7. The assembly according to claim 1, wherein the handle is attached to both the stove and the vertical pole, and the handle supports the stove in the proper orientation.

8. The assembly according to claim 1, wherein the stove further includes a leg member to support the stove when not attached to the vertical pole.

9. The assembly according to claim 1, wherein the downward sloping pole further includes a stopnut to limit the movement of the vertical adjustment member.

10. The assembly according to claim 7, wherein the handle is capable of rotation relative to and about the vertical pole.

11. The assembly according to claim 1, wherein the handle includes a locking member for locking the handle to the vertical pole, to prevent any relative rotation.

12. The assembly according to claim 1, wherein the top of the vertical pole includes a projection, the assembly further including ropes attachable to the projection and to the ground to prevent undesired movement of the vertical pole.

13. The assembly according to claim 1, wherein the frame further includes means for stabilizing the frame, to prevent any undesired movement of the frame.

14. The assembly according to claim 13, wherein the stabilizing means comprises at least one rope member attached at one end to the frame and to the other end to a stake or a sandbag.

15. A solar assembly for heating a stove with solar energy comprising:

a foundation pipe having an opening;

a substantially vertical pole positioned in the opening of the foundation pipe and capable of rotation within the foundation pipe;

a stove releasably attached to the vertical pole;

a downward sloping arm fixed to a top end of the vertical pole;

a vertical adjustment member slidably positionable on the downward sloping arm and a bail member attached to the vertically adjustments, the vertical adjustment member having an adjustable height;

a frame supporting a solar collector, the frame pivotally attached to the bail member; and means for remotely adjusting the solar collector to maximize exposure of the solar collector to the sun.

16. The assembly according to claim 15 wherein:

the vertical adjustment member includes a collar member;

the remote adjustment means further comprises a first rope member extending from the vertical pole cooperating with the collar member and the bail member, to, in turn, alter the distance between the collar member and the bail member; and a rope locking member attached to the vertical pole.

17. The assembly according to claim 15 wherein the remote adjusting means further includes:

a loop member positioned proximate the juncture of the vertical pipe member and the downward sloping arm;

a second rope extending from vertical adjustment member, through the loop member and generally abutting the vertical pole; and a rope locking member attached to the vertical pole.

18. The assembly according to claim 15 wherein the remote adjusting means further includes:

a third rope member extending from the frame member to the vertical pole, and a rope locking member attached to the vertical pole.

19. The assembly according to claim 15 wherein:

the vertical adjustment member includes a collar member;

the remote adjustment means further comprises a first rope member extending from the vertical pole cooperating with the collar member and the bail member, to, in turn, alter the distance between the collar member and the bail member;

a loop member positioned proximate the juncture of the vertical pipe member and the downward sloping arm;

a second rope extending from vertical adjustment member, through the loop member and generally abutting the vertical pole;

a third rope member extending from the frame member to the vertical pole; and a rope locking member attached to the vertical pole capable of locking each of the first rope, the second rope and the third rope to preclude any movement of the rope members.

* * * * *